United States Patent
Nishimura (10) Patent No.: US 8,961,037 B2
(45) Date of Patent: Feb. 24, 2015

(54) OPTICAL CONNECTOR

(75) Inventor: Akito Nishimura, Yotsukaido (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 12/580,688

(22) Filed: Oct. 16, 2009

(65) Prior Publication Data

US 2011/0091167 A1 Apr. 21, 2011

(51) Int. Cl.
G02B 6/36 (2006.01)
G02B 6/42 (2006.01)

(52) U.S. Cl.
CPC ............ *G02B 6/4214* (2013.01); *G02B 6/4249* (2013.01); *G02B 6/3644* (2013.01); *G02B 6/3652* (2013.01); *G02B 6/3696* (2013.01); *G02B 6/4228* (2013.01); *G02B 6/4239* (2013.01)
USPC ........................................................ 385/88

(58) Field of Classification Search
CPC ................................ G02B 6/32; G02B 6/3636
USPC ........................................................ 385/88
See application file for complete search history.

(56) References Cited

U.S. PATENT DOCUMENTS

| | | | | |
|---|---|---|---|---|
| 4,900,118 A | * | 2/1990 | Yanagawa et al. | 385/24 |
| 6,493,484 B1 | * | 12/2002 | Deri et al. | 385/27 |
| 7,404,679 B2 | * | 7/2008 | Ebbutt et al. | 385/78 |
| 7,441,965 B2 | * | 10/2008 | Furuno et al. | 385/93 |
| 2002/0131699 A1 | * | 9/2002 | Raguin et al. | 385/33 |
| 2002/0176670 A1 | * | 11/2002 | Shinoda et al. | 385/80 |

FOREIGN PATENT DOCUMENTS

| | | | | |
|---|---|---|---|---|
| JP | 05215941 A | * | 8/1993 | |
| JP | 11194230 A | * | 7/1999 | |
| JP | 2001-174671 A | | 6/2001 | |
| JP | 200384172 A | * | 3/2003 | |
| JP | 2007-121973 A | | 5/2007 | |

* cited by examiner

Primary Examiner — Ryan Lepisto
Assistant Examiner — Erin Chiem
(74) Attorney, Agent, or Firm — Sughrue Mion, PLLC (57) ABSTRACT

An optical connector body is formed by an optically-transparent resin molding. The optical connector body includes an optical fiber insertion hole formed parallel to a board surface, a wall with which an optical fiber provided at a front of the optical fiber insertion hole contacts, and an internal reflection surface adjacent to and in front of the wall. The internal reflection surface is formed at a bottom surface of a bottomed hole opened from outside in the optical connector body.

5 Claims, 8 Drawing Sheets

OPTICAL CONNECTOR

BACKGROUND OF THE INVENTION

1. Field of the Invention

The present invention relates to an optical connector. Specifically, the present invention relates to an optical connector that optically connects optical members and optical devices by use of optical reflection in the optical connector.

2. Description of the Related Art

Japanese Patent Application Laid-Open Publication No. 2001-174671 (Patent Document 1) and Japanese Patent Application Laid-Open Publication No. 2007-121973 (Patent Document 2) disclose a conventional optical connector that optically connects optical fibers provided parallel to a circuit board to an optical element on the circuit board. Such an optical connector optically connects the optical fibers to the optical element by use of internal reflection. The internal reflection is a reflection of light in an optical connector body, through which the light passes. The reflection is generated in an interface between the body and an exterior thereof (such as air).

Figure 1:
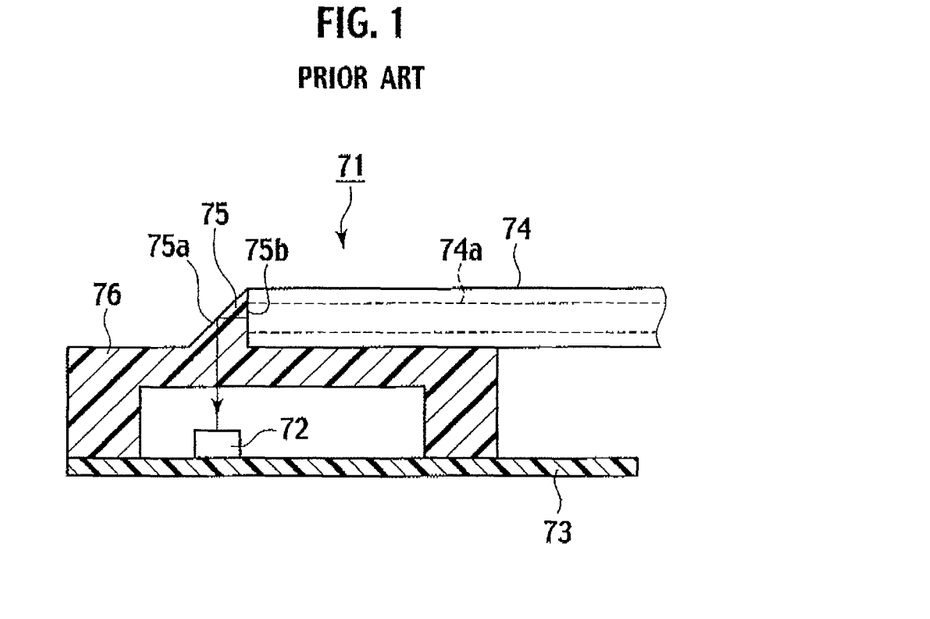
FIG. 1 is a cross-sectional view of a conventional optical connector.
Figure 2:
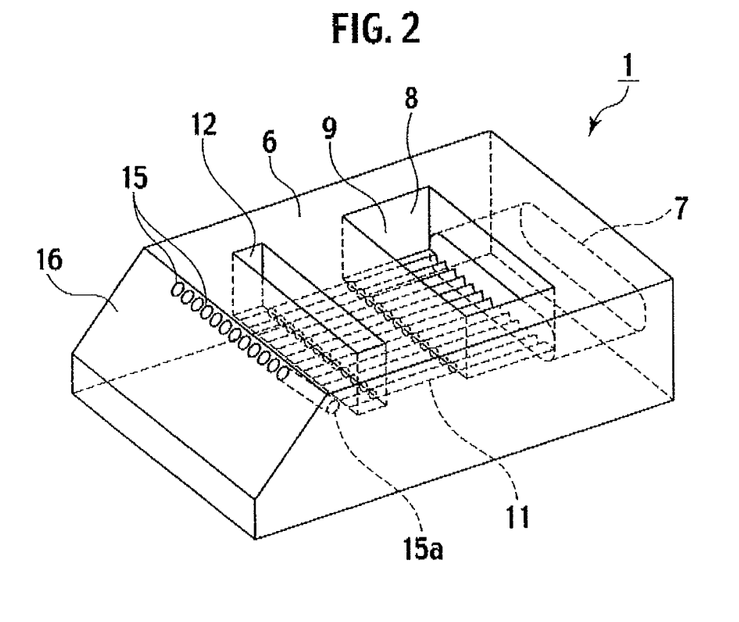
FIG. 2 is a perspective view of an optical connector according to a first embodiment of the present invention.
Figure 3:
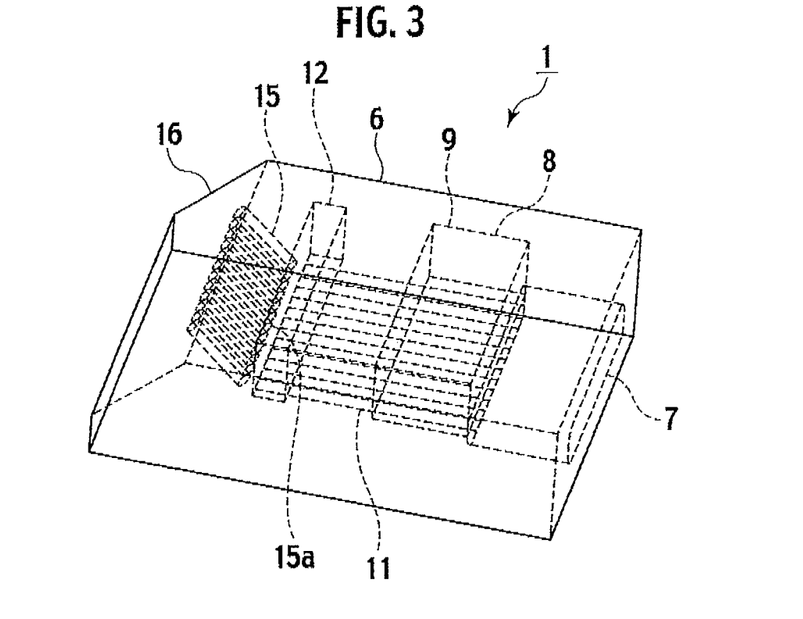
FIG. 3 is a perspective view of an optical connector according to a first embodiment viewed from a direction in which a mounting surface thereof is provided.
Figure 4:
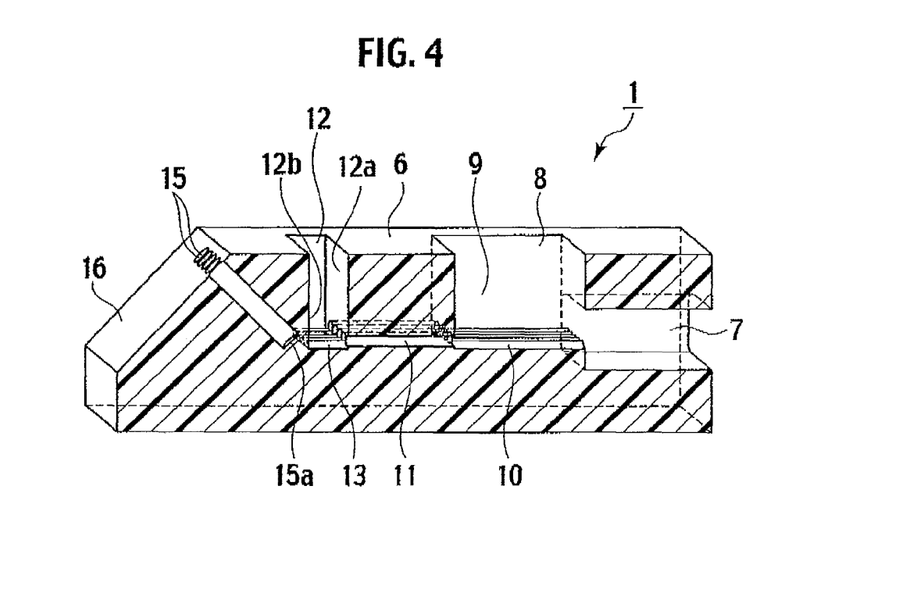
FIG. 4 is a perspective cutaway view of an optical connector according to a first embodiment.

FIG. 1 shows an optical connector (optical element module) 71 of Patent Document 1. The optical connector 71 includes a transparent frame 76, which is mounted on a circuit board 73. The frame 76 is provided with a convex portion 75. The convex portion 75 is formed in a rectangular triangle having an incline 75a inclined at 45 degrees with respect to the circuit board 73 and a vertical surface 75b vertically formed with respect to the circuit board 73. An optical fiber 74 contacts with the vertical surface 75b of the convex portion 75. The incline 75a of the convex portion 75 is an internal reflection surface (the internal reflection surface is also shown by 75a). A reference sign 74a represents a core of the optical fiber.

Light emitted from a tip of the optical fiber 74 in the above-mentioned optical connector 71 enters the convex portion 75 from the vertical surface 75b, and is reflected (internally reflected) by the incline of the convex portion 75, i.e. the internal reflection surface 75a. The light reflected by the internal reflection surface 75a travels downwardly (i.e. perpendicularly) in the figure, and enters an optical element 72 on the circuit board 73. Alternatively, the light emitted from the optical element 72 enters the optical fiber 74 in the same optical path.

In order to enhance light collection efficiency in each end surface of the optical fibers and a light receiving surface of the optical element, the internal reflection surface 75a may be configured to be curved (refer to FIG. 3 of Patent Document 1).

The optical connector of Patent Document 2 includes an optical connector body made of a transparent material. The optical connector body is mounted on a circuit board. The optical connector body has bottomed holes formed parallel to the circuit board. Optical fibers are inserted into the bottomed holes. In addition, the optical connector body has a concave portion provided in front of tips of the optical fibers inserted into the bottomed holes. The concave portion has an incline. The incline faces the tips of the inserted optical fibers, and is inclined at 45 degrees with respect to each optical axis of the optical fibers. The incline functions as an internal reflection surface. That means light emitted from the tips of the optical fibers is reflected (internally reflected) by the incline toward the circuit board, and enters an optical element on the circuit board.

SUMMARY OF THE INVENTION

As described above, such a conventional optical connector is provided with a convex portion or concave portion. The convex portion or concave portion has an incline facing optical fibers inserted into an optical connector body. The incline functions as an internal reflection surface.

The incline is formed by a resin molding concurrently with a formation of the optical connector body. In view of a loss of connection, it is necessary to form the incline precisely with respect to each optical axis of the optical fibers. Especially, in the optical connector body into which a plurality of the optical fibers are inserted, it is required to form high-accuracy micro curved surfaces when the micro curved surfaces are formed in the incline with respect to each optical fiber. However, it is generally difficult to form such a configuration. This is because it is not simple to form a plurality of micro curved surfaces (e.g. paraboloids of revolution) in one surface of a metal mold used for the resin molding of the optical connector body.

The present invention has been made to solve the above-mentioned problem. It is an object of the present invention to provide an optical connector in which internal reflection surfaces are easy to form.

An aspect of the present invention provides an optical connector comprising an optical connector body formed by a resin molding. The optical connector body includes: an optical fiber insertion hole; a bottomed hole having a bottom surface, the bottomed hole being formed inward from an outer surface of the optical connector body; and a reflection surface formed at the bottom surface of the bottomed hole, the reflection surface being configured to reflect light in the optical connector body, the light passing through an optical fiber inserted into the optical fiber insertion hole, and the reflection surface being configured to optically connect the optical fiber to an optical element provided outside. A part of the optical connector body through which the light passes is optically transparent.

The optical connector body may further include a concave portion between the optical fiber insertion hole and the bottom surface in a depth direction of the optical fiber insertion hole, the concave portion being configured to be filled with an adhesive agent. In this case, the concave portion includes a first wall and a second wall facing the first wall. The optical fiber insertion hole is open to the first wall. In addition, the optical fiber contacts with the second wall through the optical fiber insertion hole.

The optical connector body may further include: an opening to introduce the optical fiber from outside into the optical fiber insertion hole; and a hollow portion between the opening and the optical fiber insertion hole, the hollow portion being open outward to be filled with an adhesive agent.

The bottom surface of the bottomed hole preferably has a flat surface.

The bottom surface of the bottomed hole preferably has a curved surface with a convex shape toward an opening of the bottomed hole.

A plurality of the optical fiber insertion holes may be provided. In this case, the bottom surface of the bottomed hole is preferably formed by extending in an array direction of the plurality of the optical fiber insertion holes so that the bottomed hole is a common hole with respect to the plurality of the optical fiber insertion holes.

DETAILED DESCRIPTION OF THE PREFERRED EMBODIMENTS

Hereinafter, description will be made below in detail of each embodiment of the present invention with reference to the figures.

First Embodiment

Figure 8:
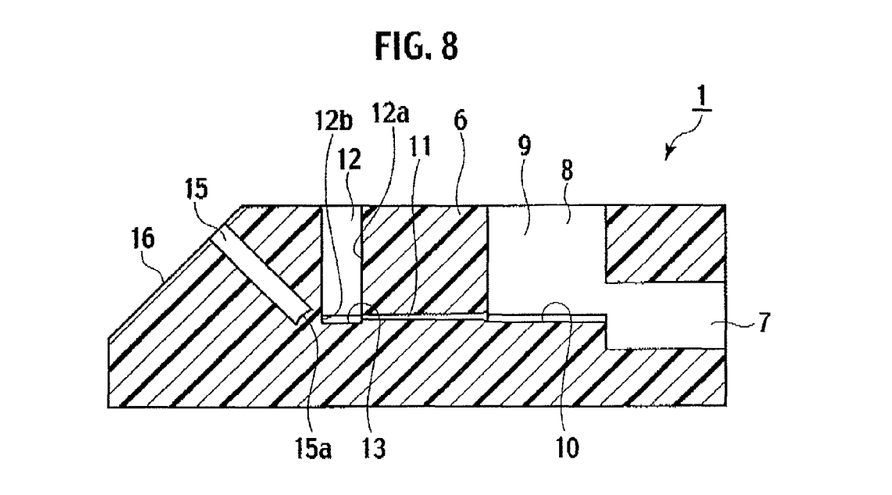
FIG. 8 is a cross-sectional view taken along the line A-A in FIG. 5.
Figure 9:
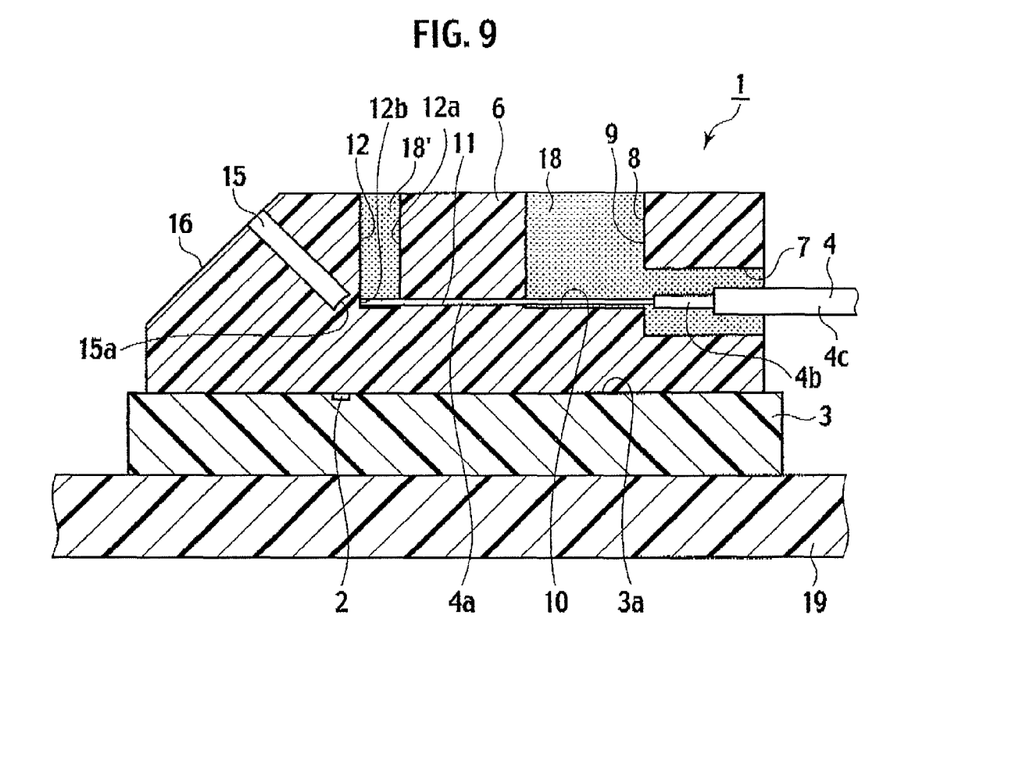
FIG. 9 is a cross-sectional view showing a condition that an optical fiber is connected to an optical connector according to a first embodiment mounted on a circuit board.

FIGS. 2 to 5 are respectively a perspective view of an optical connector 1, a perspective view showing in a direction opposite to a mounting surface of the optical connector 1, a perspective cutaway view of the optical connector 1 and a plan view of the optical connector 1 according to a first embodiment of the present invention. FIG. 8 is a cross-sectional view taken along the line A-A in FIG. 5. FIG. 9 is a cross-sectional view showing a condition that an optical fiber is connected to the optical connector 1 mounted on a circuit board. Hereinafter, a left side in FIG. 9 is defined as a front, a right side is defined as a rear, an upper side is defined as an upper portion, and a lower side is defined as a lower portion, respectively, if not otherwise specified.

As shown in FIG. 9, the optical connector 1 of the present embodiment is mounted on an optical module 3 provided with an optical element 2. An optical fiber 4 is provided parallel to an upper surface 3a of the optical module 3. Note that, the optical fiber 4 in FIG. 9 represents one optical fiber of an optical fiber ribbon. The optical connector 1 transmits an optical signal from the optical fiber 4 to the optical element 2, or vise versa, using an internal reflection. In other words, the optical connector 1 is a connector that optically connects the optical fiber to the optical element using an internal reflection, or an optical connector that connects an optical path (first optical path) between the optical fiber and an internal reflection surface to an optical path (second optical path) between the internal reflection surface intersecting the first optical path and an optical element.

The optical connector 1 includes an optical connector body 6 formed by a resin molding. The resin has a high optical transparency to light used for an optical transmission. Note that, a wavelength of light to be used is, for instance, 850 nm, 1310 nm and 1550 nm. Such optically transparent resin includes PC (polycarbonate), PEI (polyetherimide), PPA (polyphthalamide), and the like.

The optical connector body 6 is provided with an opening 7, an adhesive agent filling window 8, and a hollow portion 9. The opening 7 is open to a rear side of the optical connector body 6 so as to introduce (guide) the optical fiber 4 to the optical connector body 6. The adhesive agent filling window 8 is open to an upper side of the optical connector body 6. The hollow portion 9 is communicated with the opening 7 and the adhesive agent filling window 8.

A bottom portion of the adhesive agent filling window 8 in the hollow portion 9 is provided with optical fiber guide grooves 10. Each optical fiber guide groove 10 is configured to have a V-shape or a U-shape of a cross-section, or a similar shape to those. In addition, optical fiber insertion holes 11 extending forward from a front end (left end in FIGS. 4 to 9) of each optical fiber guide groove 10 are formed.

A covering of a front portion of the optical fiber 4 is removed so that a bare optical fiber 4a is exposed. The bare optical fiber 4a is to be inserted into each optical fiber insertion hole 11 (refer to FIG. 9).

A concave portion 12 is provided in front of an exit of each optical fiber insertion hole 11. The concave portion 12 includes a first wall 12a and a second wall 12b facing the first wall 12a, and is open to an upper side of the optical connector body 6. The first wall 12a is open for the exit of each optical fiber insertion hole 11. The optical fiber 4 inserted into the optical fiber insertion hole 11 contacts with the second wall 12b.

Note that, a bottom surface of the concave portion 12 may be provided with optical fiber guide grooves 13 configured to have a V-shape, a U-shape, or the like of a cross-section.

Figure 5:
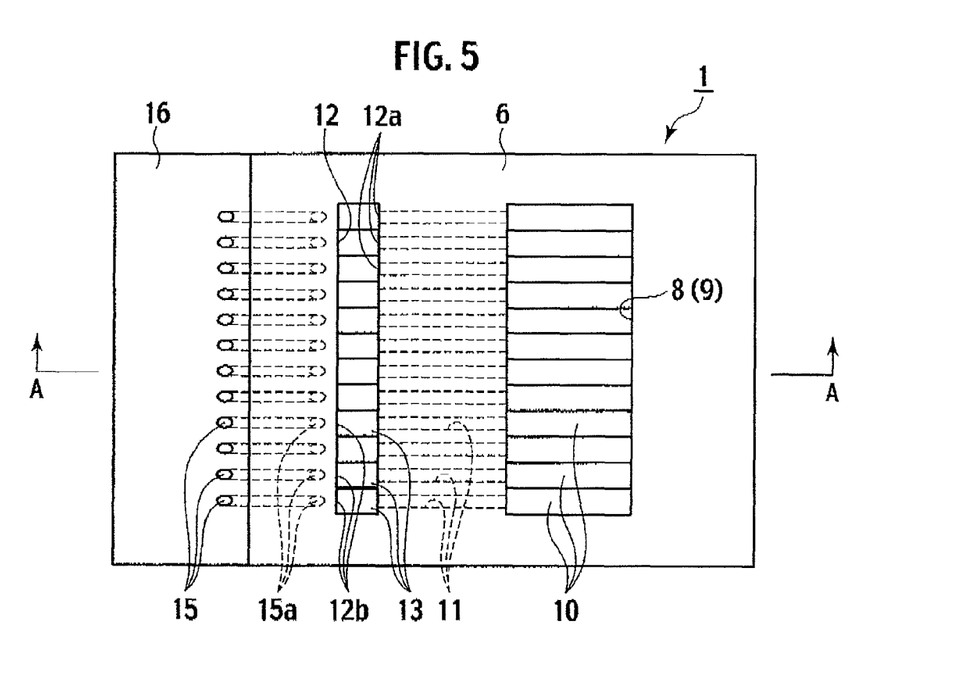
FIG. 5 is a plan view of an optical connector according to a first embodiment.

As shown in FIG. 5, internal reflection surfaces 15a are formed adjacent to and in front of the second wall 12b, and formed with respect to each optical fiber 4. That means each internal reflection surface 15a is formed with respect to each optical path.

The internal reflection surfaces 15a are also bottoms of each bottomed hole 15 deeply formed from an inclined outer surface 16 of the optical connector body 6 toward the second wall 12b. Each internal reflection surface 15a is located adjacent to the second wall 12b so as to intersect with each central axis (not shown in the figure) of the optical fiber insertion holes 11 (or optical fiber 4 inserted into each optical fiber insertion hole 11).

Figure 10:
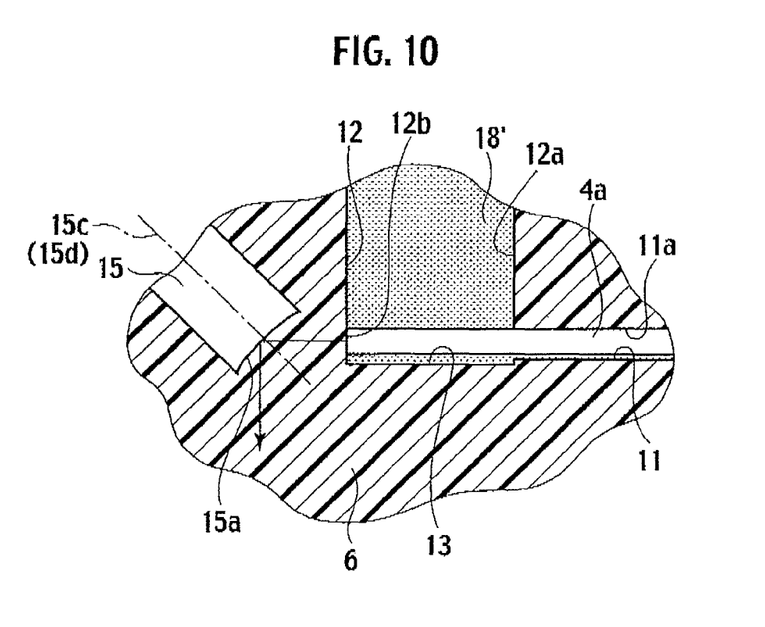
FIG. 10 is an enlarged view of a main part of FIG. 9.

The following are descriptions of the optical connector 1 based on FIG. 9 and FIG. 10. The optical connector 1 of the present embodiment is connected with the optical fiber ribbon, for instance. The optical fiber 4 in FIG. 9 represents one optical fiber of the optical fiber ribbon. The optical fiber 4 is composed of the bare optical fiber 4a composed of a core and cladding, and a covering 4b covering the bare optical fiber 4a. In addition, the optical fiber 4 is covered with a tape covering portion 4c for composing the optical fiber ribbon.

The optical fiber (optical fiber ribbon) 4 is inserted from the opening 7 that is open to the rear side of the optical connector body 6. A gap between the tape covering portion 4c and the opening 7 may be provided with a protection member (not shown in the figure) such as a strain relief (bushing). The protection member is, for instance, a protective boots made of an elastic body, or an adhesive agent having elasticity after solidification.

The bare optical fiber 4a exposed by removing all resin coverings 4b and 4c from the tip of the optical fiber ribbon is inserted into the optical fiber insertion hole 11 by being guided by the optical fiber guide groove 10 provided in front of the optical fiber insertion hole 11. An inner diameter of the optical fiber insertion hole 11 is larger with a several μm than an outer diameter of the bare optical fiber 4a.

When the optical fiber 4 is further inserted, the tip of the bare optical fiber 4a is exposed from the first wall 12a of the concave portion 12, followed by contacting with the second wall 12b. Due to such a contact, a relative position of the optical fiber 4 with respect to the optical connector body is to be determined.

Then, the hollow portion 9 is filled with an adhesive agent 18 from the adhesive agent filling window 8, thereby fixing the optical fiber 4. In addition to a filling of the adhesive agent 18, the concave portion 12 is also filled with an adhesive agent 18'. Bubbles due to the filling of the adhesive agents 18 and 18' are removed from the opening of the concave portion 12 and the adhesive agent filling window 8.

The filled adhesive agents 18 and 18' contract when they are hardened. The adhesive agents are communicated with an external air via the adhesive agent filling window 8 or the concave portion 12. Therefore, a contractional deformation (internal stress) caused when being hardened is released outside, which prevents a position of the optical fiber 4 from being influenced.

Note that, when not providing with the concave portion 12, a bottom surface of each optical fiber insertion hole 11 is to be a contact surface for the optical fiber 4.

The optical connector 1 connected with the optical fiber 4 as shown in FIG. 9 is mounted on the optical module 3 provided with the optical element 2 such as VCSEL and PD by being positioned in order to optically connect with respect to the optical element 2 appropriately. FIG. 9 shows a condition that the optical connector 1 is mounted on the optical module 3 located on a circuit board 19. Meanwhile, the optical connector 1 of the present embodiment may be mounted on the circuit board 19 without using the optical module 3. In such a case, the optical element 2 is directly located on the circuit board 19.

Light emitted from the tip of the bare optical fiber 4a travels from the second wall 12b of the concave portion 12 through the transparent resin of the optical connector body 6, internally reflected by the bottom surface of the bottomed hole 15, i.e. the internal reflection surface 15a, and travels downwardly (perpendicularly). That means the optical path is converted by the internal reflection surface 15a. The light reflected by the internal reflection surface 15a passes through the transparent resin of the optical connector body 6, and enters the optical element 2 on the optical module 3. The light emitted from the optical element 2 enters the core of the bare optical fiber 4a via the opposite optical path.

The following are descriptions of a configuration of the internal reflection surface 15a.

The internal reflection surface 15a has a flat surface, or a curved surface with a convex shape toward an opening of the bottomed hole 15. In other words, when viewing from inside the optical connector, the internal reflection surface 15a functions as a flat mirror or a concave mirror having a light collection function. The concave mirror is configured to have a spherical surface, or an aspherical surface such as a paraboloid of revolution, for instance. Note that, the internal reflection surface 15a has an area to cover at least a spot diameter of light when viewing from incoming and outgoing directions of light.

When the internal reflection surface has a flat surface 15a, an angle of the internal reflection surface 15a with respect to a central axis 15c of the bottomed hole 15 is determined depending on locations of the optical fiber 4 and the optical element 2 (i.e. locations of the first and second paths to be assumed). For instance, the optical connector body 6 shown in FIG. 9 is provided with the inclined outer surface 16 at a front thereof. The inclined outer surface 16 is inclined at 45 degrees with respect to an upper surface 3a of the optical module 3, for instance. The optical fiber 4 is located parallel to the upper surface 3a of the optical module 3. An optical axis of the optical element 2 is perpendicular to the upper surface 3a. The bottomed hole 15 is formed perpendicular to the inclined outer surface 16. In such a configuration of the optical connector body 6, the internal reflection surface 15a is formed perpendicular to the central axis 15c of the bottomed hole 15 and parallel to the inclined outer surface 16. However, the angle of the internal reflection surface 15a with respect to the central axis 15c of the bottomed hole 15 is not limited to 90 degrees as described above.

FIG. 10 shows the internal reflection surface 15a formed as an axisymmetric concave surface. In this figure, a central axis (rotationally symmetric axis) 15d of the internal reflection surface 15a corresponds to the central axis 15c of the bottomed hole 15 (also refer to FIG. 8). By forming the internal reflection surface 15a as a concave surface, the internal reflection surface 15a can collect (i.e. focus) light from the optical element 2 (or optical fiber 4) in the optical fiber 4 (or optical element 2). In other words, it is possible to avoid a loss of connection between the optical element 2 and the optical fiber 4, and improve optical connection efficiency between the optical element 2 and the optical fiber 4.

In FIG. 10, the central axis 15d corresponds to the central axis 15c. However, the present embodiment is not limited to this case. An angle formed by the central axis 15c of the bottomed hole 15 and the central axis 15d of the internal reflection surface 15a is dependent on the locations of the optical fiber 4 and the optical element 2 (i.e. locations of the first and second paths to be assumed). Therefore, depending on these locations, the internal reflection surface 15a may be formed so that the central axis 15c intersects with the central axis 15d in order to obtain a desired reflection angle (refer to FIG. 7).

The optical connector body 6 is manufactured by an injection molding, for instance. The optical connector body 6 is manufactured by filling a cavity in a metal mold (not shown in the figure) with optically transparent resin. In this case, metallic core pins (not shown in the figure) are provided in the cavity as metal mold parts to form each bottomed hole 15. Each core pin has a configuration corresponding to that of each bottomed hole 15, and is separable from a metal mold piece to form a part other than the bottomed holes 15 of the optical connector body 6.

The following are descriptions of a case where the bottom surface 15a of each bottomed hole 15 has a curved surface with a convex shape toward the opening.

The metallic core pins are provided at set positions in the cavity in the metal mold. The core pins are used to form each bottomed hole 15 in the optical connector body 6 when molding. Each core pin is a thin round rod with a circular section having a concave surface at a tip thereof. The configuration of the concave surface corresponds to that of the internal reflection surface 15a.

Note that, in the conventional molding of the optical connector, a plurality of micro curved surfaces corresponding to the internal reflection surfaces are integrally formed in a metal mold. More specifically, a plurality of concave portions corresponding to the plurality of the micro curved surfaces in the optical connector are formed in one surface of a metal mold piece to form an outer surface of the optical connector. However, such a metal mold piece having the plurality of the concave portions is not easy to manufacture with high accuracy. For instance, when a defect in one of the concave portions is found, or when an arrangement pitch of the concave portions is disrupted, such a metal mold piece is determined to be a defective. As a result, the cost tends to be quite high.

On the other hand, in the molding of the optical connector body 6 in the present embodiment, each core pin is used as a core to form each micro curved surface for which high accuracy is required. It is considerably simple to form the concave surfaces with high accuracy by forming a tip of each core pin by a grinding process, a cutting process or other means, compared with the conventional case where the plurality of the concave surfaces are formed with high accuracy in a wide surface in the large metal mold.

When accuracy of any micro curved surface of the tips of the core pins is not adequate, the only corresponding core pin can be exchanged for a non-defective one. Thus, it is possible to easily form the metal mold necessary to manufacture the optical connector body, compared with the conventional metal mold of which the whole is to be unusable because of a defect of one micro curved surface. Thus, it results in minimizing manufacturing costs.

Moreover, in the conventional case, it is necessary to form a completely new metal mold according to each change whenever a configuration such as a size, a curvature, a reflection angle of the internal reflection surfaces, an arrangement pitch and the number of arrays is to be changed. Metal molds are complicated and costly to manufacture. Note that, the change of the arrangement pitch represents a change of intervals and numbers of the internal reflection surfaces. Also, the change of the number of arrays represents a change to arrange the horizontally-aligned internal reflection surfaces in two lines or more.

By contrast, with regard to the metal mold to manufacture the optical connector body 6 by a resin molding in the present embodiment, a change of intervals of the arranged core pins or locations of each core pin is only required appropriately. Therefore, the metal mold is distinctly simple and less costly to form compared with the conventional one. Such an advantage can be also achieved in the case of the internal reflection surfaces with a flat surface, similar to the case of the internal reflection surfaces with a curved surface.

According to the present invention, the only core pins in the metal mold can be exchanged when a configuration of the internal reflection surfaces is to be changed. Thus, it is possible to deal with the change of the configuration quite easily, and form the desirable internal reflection surfaces appropriately. Accordingly, manufacturing costs can be minimized.

The following are descriptions of the further specified configuration of the internal reflection surface 15a in the bottom surface of each bottomed hole 15. Note that, the following are descriptions of a case where each internal reflection surface 15a is a curved surface. However, the internal reflection surface 15a may be a flat surface. The internal reflection surface 15a with a flat surface has similar effectiveness to that with a curved surface.

Figure 6:
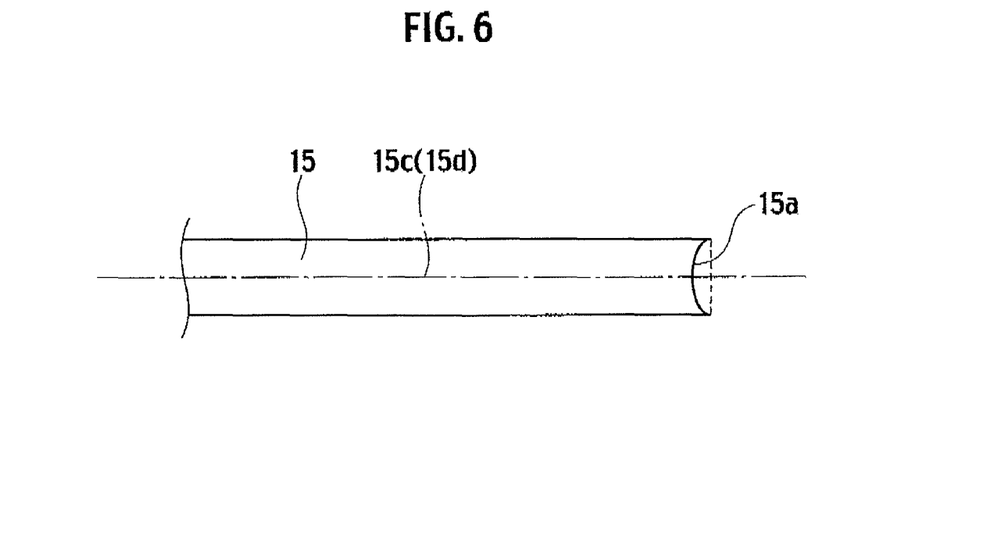
FIG. 6 is a view showing one curved surface configuration of an internal reflection surface in a bottom surface of a bottomed hole according to one embodiment of the present invention.

FIG. 6 is a cross-sectional view of the bottomed hole 15. As described above referring to FIG. 10, the internal reflection surface 15a is formed at the bottom surface of the bottomed hole 15. The internal reflection surface 15a is configured to have a curved surface with a convex shape toward an opening of the bottomed hole 15. In other words, when viewing from inside the optical connector body 6, the internal reflection surface 15a functions as a flat mirror. The internal reflection surface 15a is configured to be axisymmetric with respect to the central axis (rotationally symmetric axis) 15d.

The central axis 15d of the internal reflection surface 15a may correspond to the central axis 15c of the bottomed hole 15 (refer to FIG. 6). The internal reflection surface 15a having such a symmetric configuration can be formed easily with high accuracy when molding. This is because the internal reflection surface 15a in FIG. 6 is also axisymmetric with respect to the central axis 15c of the bottomed hole 15, and the core pin to form the bottomed hole 15 can be formed to be axisymmetric with respect to a central axis of the core pin. That means when the core pin is provided in the metal mold, an inclined angle of the internal reflection surface 15a with respect to the optical axes of the optical fiber 4 and the optical element 2 is not influenced even when the core pin rotates around the central axis thereof.

Figure 7:
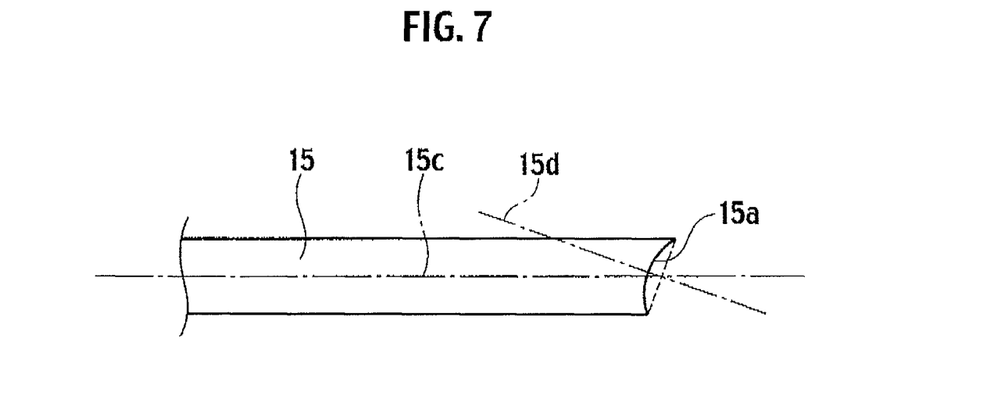
FIG. 7 is a view showing one curved surface configuration of an internal reflection surface in a bottom surface of a bottomed hole according to one embodiment of the present invention.

Meanwhile, the central axis 15d of the internal reflection surface 15a may intersect with the central axis 15c of the bottomed hole 15 (refer to FIG. 7). In such a case, a cross-sectional outline of the internal reflection surface 15a is to be asymmetric with respect to the central axis 15c. When, for instance, a depth direction (extending direction) of the optical fiber insertion hole 11 is not parallel to the upper surface of the optical module 3, the bottomed hole 15 shown in FIG. 7 may be adequate to conform an optical axis of the first optical path to that of the second optical path. Note that, it is somewhat difficult to manufacture the core pin to form bottomed hole 15 shown in FIG. 7 and provide the core pin in the metal mold. However, it is still possible to form the appropriate internal reflection surface 15.

When the optical connector 1 is mounted on the optical module 3, it is necessary to precisely position the optical connector 1 with respect to the optical element 2 on the optical module 3.

As a positioning means, a combination of an engaging projection and an engaging recess that engages with the engaging projection can be included, for instance. The engaging projection is provided on the bottom surface of the optical connector body 6. While, the engaging recess is provided on the optical module 3. Conversely, the engaging projection may be provided on the optical module 3, and the engaging recess may be provided on the optical connector body 6. The positioning means between the optical connector and the optical module can be changed in design accordingly, and a variety of shapes can be employed as a positioning means.

Second Embodiment

Figure 11:
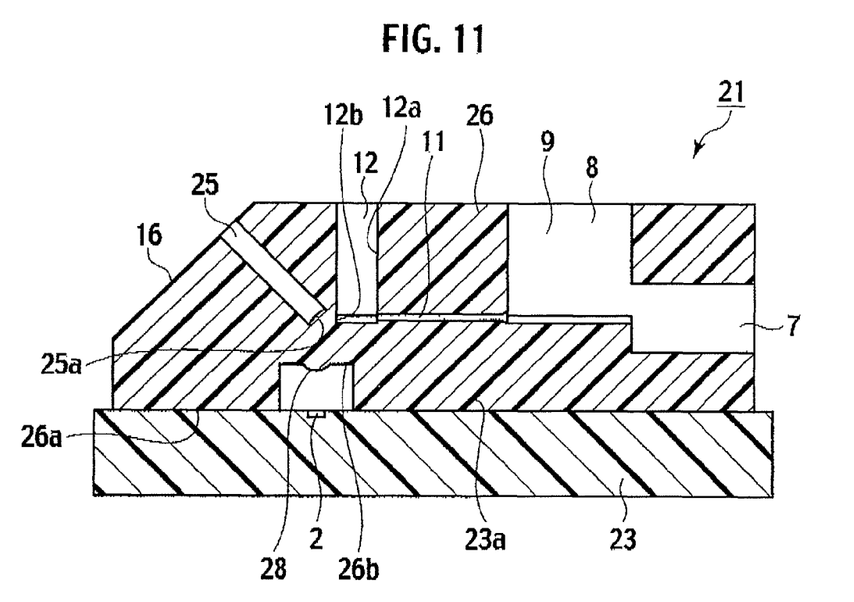
FIG. 11 is a cross-sectional view of an optical connector according to a second embodiment of the present invention.

FIG. 11 shows an optical connector 21 according to a second embodiment of the present invention. Note that, common members to the first embodiment are indicated with the same reference numerals, and the explanations thereof are omitted.

The optical connector 21 includes an optical connector body 26. The optical connector body 26 includes a bottomed hole 25. The bottomed hole 25 is deeply formed from the inclined outer surface 16 of the optical connector body 26 toward the second wall 12b. A bottom surface of the bottomed hole 25 is a flat surface, and also an internal reflection surface 25a to function as a mere flat mirror.

A concave portion 26b may be provided at a portion facing the optical element 2 in the optical connector body 26. In this case, a lens 28 may be provided at an upper surface of the concave portion 26b. The lens 28 is configured to have a curved surface with a convex shape so as to have a light collection function.

The lens 28 collects light, which is emitted from an optical fiber inserted into the optical fiber insertion hole 11 and reflected by the internal reflection surface 25a, in the optical element 2. Alternatively, the lens 28 introduces light emitted from the optical element 2 into a core of the optical fiber without being diffused.

The bottom surface of the bottomed hole 25 can be configured to have a curved surface as described in the first embodiment.

In addition, the lens 28 and the concave portion 26b according to the present embodiment can be provided in the optical connectors according to the other embodiments.

Third Embodiment

Figure 12:
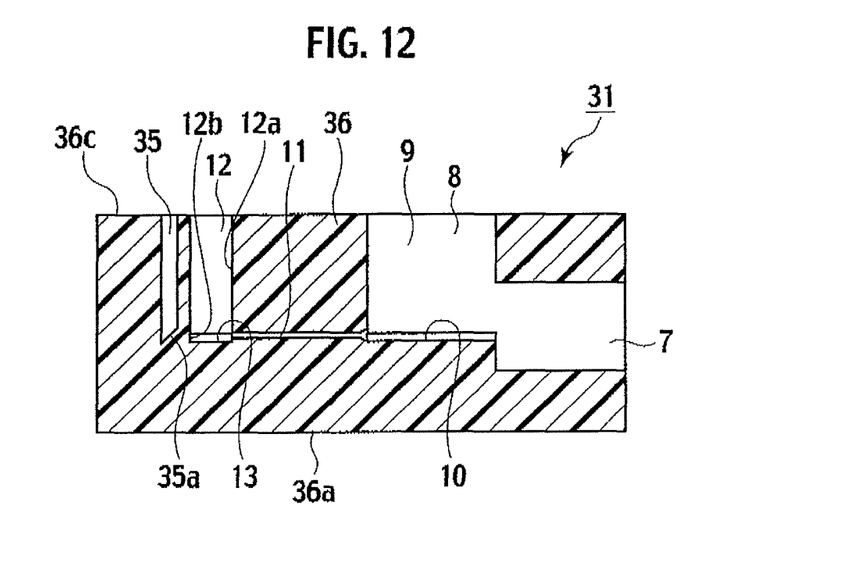
FIG. 12 is a cross-sectional view of an optical connector according to a third embodiment of the present invention.

FIG. 12 shows an optical connector 31 according to a third embodiment of the present invention. Note that, common members to the first embodiment are indicated with the same reference numerals, and the explanations thereof are omitted. The optical connector 31 includes an optical connector body 36. The optical connector body 36 includes a bottomed hole 35. The bottomed hole 35 is downwardly and perpendicularly formed from an upper surface 36c of the optical connector body 36. The upper surface 36c is an outer surface provided on the opposite side to a mounting surface 36a on a circuit board (not shown in the figure) on which the optical connector body 36 is placed. In the present embodiment, the upper surface 36c and the mounting surface 36a are parallel to one another.

A bottom surface of the bottomed hole 35 is an internal reflection surface 35a. The internal reflection surface 35a is a flat surface and inclined with respect to a central axis of the bottomed hole 35. When the optical fiber insertion hole 11 is formed parallel to the mounting surface 36a, and when an optical axis of an optical element (not shown in the figure) is perpendicular to the mounting surface 36a, the internal reflection surface 35a is inclined at 45 degrees with respect to a depth direction (extending direction) of the optical fiber insertion hole 11 and the optical element so that light travels along each optical axis. However, such an inclined angle is dependent on the location and depth direction of the optical fiber insertion hole 11, and the location and direction of the optical axis of the optical element. Therefore, the inclined angle may include other values other than 45 degrees.

When the optical connector body 36 according to the present embodiment is formed by a resin molding, a core pin to form the bottomed hole 35 can be provided in a vertical direction in a metal mold used for the molding. That means it is possible to extract the metal mold with the core pin concurrently from the optical connector body 36 since the core pin can be provided in the metal mold separable in the vertical direction. Therefore, it is possible to simplify a structure around the core pin in the metal mold.

Note that, the bottom surface of the bottomed hole 35a may be configured to have a curved surface as described in the first embodiment.

Fourth Embodiment

Figure 13:
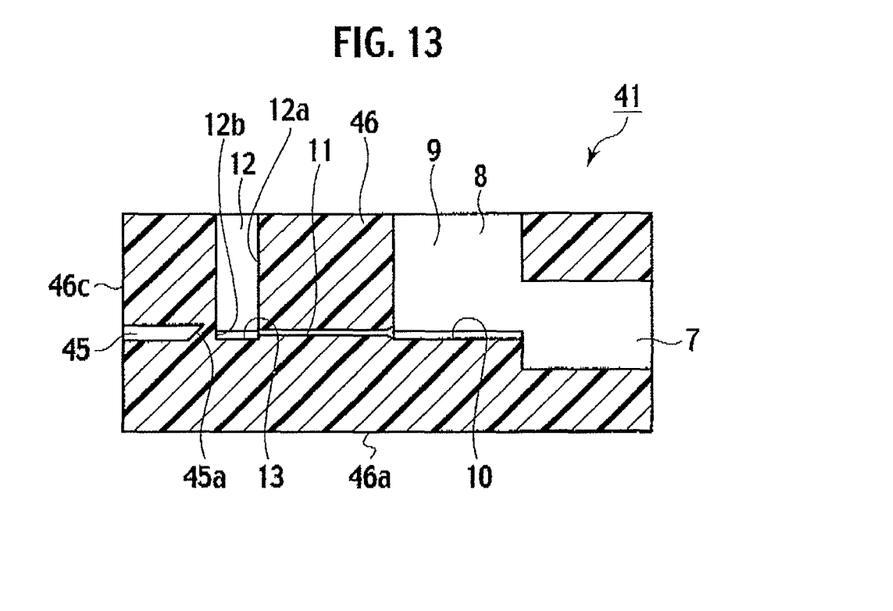
FIG. 13 is a cross-sectional view of an optical connector according to a fourth embodiment of the present invention.

FIG. 13 shows an optical connector 41 according to a fourth embodiment of the present invention. Note that, common members to the first embodiment are indicated with the same reference numerals, and the explanations thereof are omitted. The optical connector 41 includes an optical connector body 46. The optical connector body 46 includes a bottomed hole 45. The bottomed hole 45 is horizontally formed toward a tip of an optical fiber from a perpendicular outer surface 46c provided at a front of the optical connector body 46.

Similar to the third embodiment, a bottom surface of the bottomed hole 45 is an internal reflection surface 45a. The internal reflection surface 45a is inclined with respect to a central axis of the bottomed hole 45.

When the optical fiber insertion hole 11 is formed parallel to a mounting surface 46a, and when an optical axis of an optical element (not shown in the figure) is perpendicular to the mounting surface 46a, the internal reflection surface 45a is inclined at 45 degrees with respect to the depth direction (extending direction) of the optical fiber insertion hole 11 and the optical axis of the optical element so that light travels along each optical axis. However, such an inclined angle is dependent on the location and depth direction of the optical fiber insertion hole 11, and the location and direction of the optical axis of the optical element. Therefore, the inclined angle may include other values other than 45 degrees.

Note that, the bottom surface of the bottomed hole 45 may be configured to have a curved surface as described in the first embodiment.

Fifth Embodiment

Figure 14:
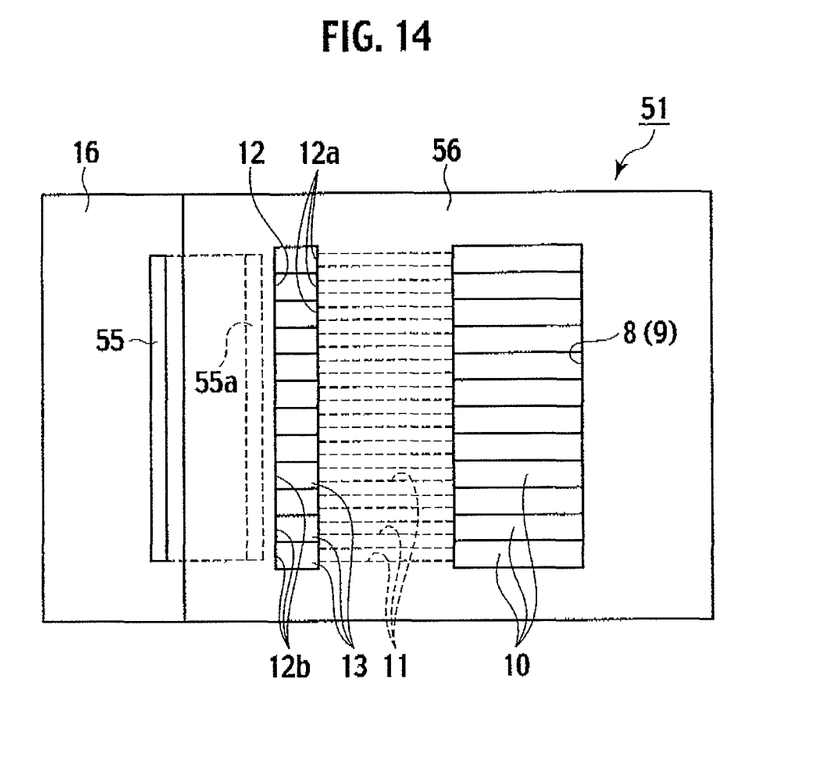
FIG. 14 is a plan view of an optical connector according to a fifth embodiment of the present invention.

FIG. 14 shows an optical connector 51 according to a fifth embodiment of the present invention. Note that, common members to the first embodiment are indicated with the same reference numerals, and the explanations thereof are omitted.

In the above-described respective embodiments, the bottomed holes having the internal reflection surfaces at the bottoms thereof are provided with respect to each optical fiber. When the internal reflection surfaces are the mere flat surfaces, each internal reflection surface may be integrally formed as a bottom surface of one bottomed hole. That means such a bottom surface functions as a common internal reflection surface (flat mirror) to every optical fiber. As shown in FIG. 14, the optical connector 51 according to the fifth embodiment includes an optical connector body 56. The optical connector body 56 includes a common bottomed hole 55 to every optical fiber. The bottomed hole 55 is configured to have a rectangular cross-section extending in an array direction of the optical fiber insertion holes 11.

The bottom surface of the bottomed hole 55 is to be an internal reflection surface 55a. The internal reflection surface 55a is a common rectangular flat surface to each optical fiber, for instance. A long side of the flat surface has an enough length at least not interrupting light traveling from the optical fibers inserted into each optical fiber insertion hole 11. In other words, the length is a distance or more between two optical fibers located at outermost ends in the aligned optical fibers.

In the resin molding of the optical connector body 56, a core to form the bottomed hole 55 having the internal reflection surface 55a is not the core pin of a round rod described in the first to fourth embodiments, but a flat plate. When a configuration (e.g. location, angle, size in the optical connector body 56) of the internal reflection surface is changed, the only core can be exchanged. Therefore, the configuration of the internal reflection surface is easy to change compared with the conventional metal mold to form the outer surface and the internal reflection surfaces of the optical connector with the only one metal mold piece.

In the optical connectors 6, 26, 36, 46 and 56 according to the respective embodiments, a surface to receive light from the optical element 2 or to emit light into the optical element 2 may be subjected to treatment to reduce a loss of connection between the optical element and the optical fibers. For instance, an antireflection (AR) coating is one example. The antireflection coating is a process to deposit a dielectric layer on the surface. The dielectric layer can be deposited by use of a physical vapor deposition (PVD) such as a sputtering.

Another example of treatment to reduce a loss of connection is to form a fine concave-convex structure on the surface to receive and emit light. The fine concave-convex structure has convex (concave) portions aligned with a smaller pitch than a wavelength of light to be used. A light reflection is reduced due to the periodically aligned convex (concave) portions.

In the above-described embodiments, each bottom surface of the bottomed holes was formed to have a paraboloid of revolution in order to provide a light collection function in the internal reflection surfaces. Meanwhile, ring-shaped concave and convex portions having different diameters may be alternately and radially provided in a concentric pattern instead of the paraboloid of revolution. Such a structure can be also employed as an internal reflection surface to have the light collection function.

Although the optical connector is described as each embodiment of the present invention, the present invention can be adapted to a so-called optical fiber array.

In addition, in the present invention, at least parts through which light passes in the optical connector body may have a transparency to light to be used. In other words, the parts between the optical fiber insertion holes and the internal reflection surfaces and between the internal reflection surfaces and the optical element in the optical connector body may have a transparency to light to be used. The other parts in the optical connector body may be made of colored resin since it is not necessary to pass light through those parts. Alternatively, the other parts may be made of other materials other than resin.

According to the present invention, the internal reflection surfaces to convert optical paths are formed at the bottoms of the bottomed holes opened from the outer surface of the optical connector body. Therefore, the metal mold for the resin molding of the optical connector body is easy to manufacture compared with the conventional structure in which the outer surface of the optical connector body itself is used as an internal reflection surface. In other words, it is easy to form desirable internal reflection surfaces.

In the present invention, the bottomed holes are formed with respect to each optical fiber in the optical connector body. The optical connector body according to the present invention can be composed of separate members, in which a metal mold piece to form a part other than the bottomed holes of the optical connector body and a metal mold piece (core) to form each bottomed hole are independently manufactured. When the optical connector body is precisely provided with a plurality of internal reflection surfaces, it is not easy to form all the internal reflection surfaces in one wide surface of the metal mold with high accuracy. However, the metal mold pieces (cores) to form each bottomed hole can be manufactured separately from the metal mold piece to form the part other than the bottomed holes of the optical connector body. Thus, it is easy to improve processing accuracy. Furthermore, it is possible to form the internal reflection surfaces with high accuracy since accuracy of an arrangement pitch of the metal mold pieces (cores) to form each bottomed hole is to be easy to maintain.

The above-described effects can be also achieved when forming the internal reflection surfaces that have a light collection function by including micro curved surfaces such as a spherical surface and a paraboloid of revolution. Compared with the conventional metal mold to form a plurality of micro curved surfaces corresponding to the internal reflection surfaces with high accuracy in a wide surface of the large metal mold, it is considerably easy to form the micro curved surfaces with high accuracy on tips of each metal mold piece (core) such as a core pin to form the bottomed holes. This results in minimizing manufacturing costs.

When a configuration such as an arrangement, the number or a reflection direction of the internal reflection surfaces is to be changed, the present invention can deal with such a change by changing the number, direction, and the like of the metal mold pieces (cores) more flexibly than the conventional metal mold in which a plurality of the internal reflection surfaces are integrally formed in one metal mold piece.

What is claimed is:

1. An optical connector optically connecting respective set of optical fibers and optical elements by internal reflection, comprising:
    an optical connector body, which is a resin molding, having a plurality of optical fiber insertion holes and a plurality of bottomed holes, each of the bottom surfaces of the bottomed holes functioning as an internal reflection surface, each of the internal reflection surfaces disposed in front of one of the optical fiber insertion holes;
    wherein the bottomed holes are filled with air,
    wherein the each of the internal reflection surfaces is integrally formed as a bottom surface of one of the bottomed holes,
    wherein a resin between the optical fiber insertion holes and the internal reflection surfaces and the resin between the internal reflection surfaces and the optical elements are light transmissive,
    wherein each of the plurality of bottomed holes is bored from an outer surface of the optical connector body and the plurality of bottomed holes are separate from each other,
    wherein the respective set of optical fibers and the optical elements is optically connected by the respective internal reflection surface, and
    wherein the internal reflection surfaces reflect light coming from the optical fiber insertion holes, and the light reflected by the internal reflection surfaces pass through the resin to the optical elements.

2. The optical connector according to claim 1, wherein a concave portion is provided in front of an exit of each of the optical fiber insertion holes, the concave portion opens toward an upper side of the optical connector body to be filled with an adhesive agent; an optical fiber contacting wall is provided in front of each of the optical fiber insertion holes in the concave portion,
    wherein the internal reflection surfaces are provided in the optical connector body in front of and adjacent to the optical fiber contacting wall.

3. The optical connector according to claim 1, wherein an opening portion for introducing the optical fiber is provided behind each of the optical fiber insertion holes, and the opening portion opens to a rear side of the optical connector body; and
    a hollow portion is provided behind each of the optical fiber insertion holes, and the hollow portion opens at the upper part of the optical connector body to be filled with an adhesive agent.

4. The optical connector according to claim 1, wherein the bottom surface of each of the bottomed holes is a flat surface.

5. The optical connector according to claim 1, wherein the bottom surface of each of the bottomed holes is a curved surface with a convex shape toward an opening side thereof.

* * * * *